United States Patent [19]

Jordan

[11] 4,418,493
[45] Dec. 6, 1983

[54] MODULAR ANIMAL TRAP

[76] Inventor: Carmel T. Jordan, 1040 Grandview Ave., Union, N.J. 07083

[21] Appl. No.: 323,958

[22] Filed: Nov. 23, 1981

[51] Int. Cl.³ .......................................... A01M 23/20
[52] U.S. Cl. ............................................. 43/67; 43/61
[58] Field of Search .................. 43/67, 61, 65, 66, 72, 43/74, 131

[56] References Cited

U.S. PATENT DOCUMENTS

| | | |
|---|---|---|
| 1,181,496 | 5/1916 | Webb et al. . |
| 1,796,380 | 3/1931 | Lyden . |
| 2,210,174 | 8/1940 | Moore . |
| 2,412,518 | 12/1946 | Krelwitz . |
| 2,502,836 | 4/1950 | Eggering ................................ 43/61 |
| 2,585,833 | 2/1952 | Pierce . |
| 2,692,453 | 10/1954 | Wingfield .............................. 43/61 |
| 3,177,608 | 4/1965 | Lindelow .............................. 43/61 |
| 3,624,952 | 12/1971 | Gordon . |
| 3,965,609 | 6/1976 | Jordan . |
| 3,975,857 | 8/1976 | Branson et al. ....................... 43/61 |
| 4,031,653 | 6/1977 | Jordan ................................... 43/61 |
| 4,062,142 | 12/1977 | Marotti ................................. 43/61 |
| 4,138,796 | 2/1979 | Souza .................................... 43/61 |
| 4,162,588 | 7/1979 | Wyant . |
| 4,179,835 | 12/1979 | Hunter . |
| 4,232,472 | 11/1980 | Muelling . |
| 4,266,362 | 5/1981 | Campbell . |
| 4,281,471 | 8/1981 | Jenkins et al. . |
| 4,288,940 | 9/1980 | Ensey . |
| 4,291,486 | 9/1981 | Lindley . |

Primary Examiner—Kuang Y. Lin
Assistant Examiner—Kurt C. Rowan
Attorney, Agent, or Firm—Martha G. Pugh

[57] ABSTRACT

This invention relates to an animal trap comprising a system of interconnected modular units including a gate which is treadle-operated by an entering animal to snap to latched-closed position from an open position adjacent the floor of the trap. The trap includes a disabling device to permit pre-baiting. As a special feature for preventing contamination, it includes a hermetically-sealed capture module with a plastic bag liner, which may be disengaged from the system for disposal purposes. A device is also disclosed for automatically resetting the trap on a periodic basis.

10 Claims, 8 Drawing Figures

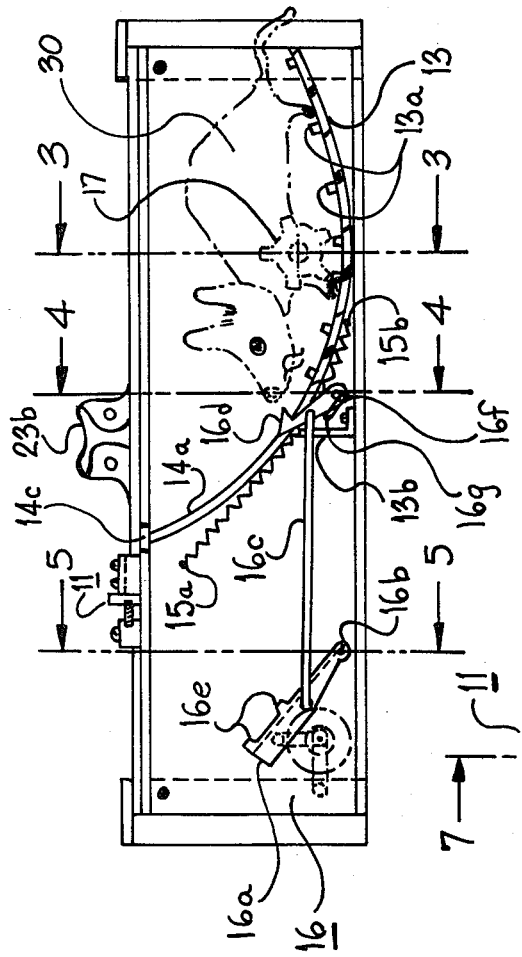
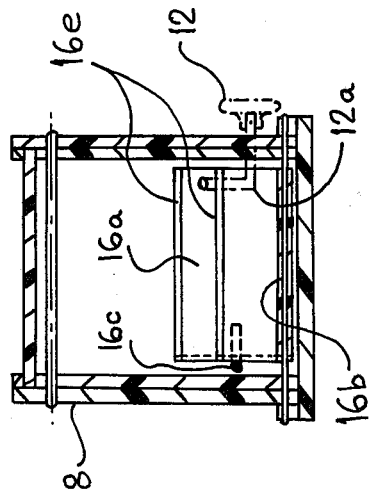
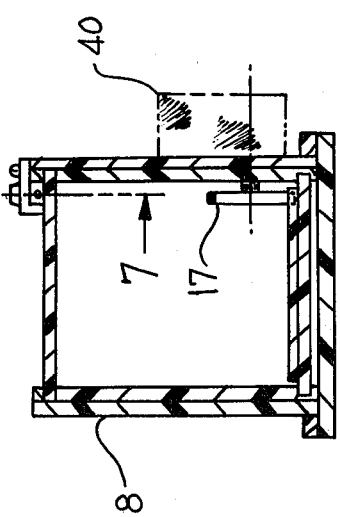

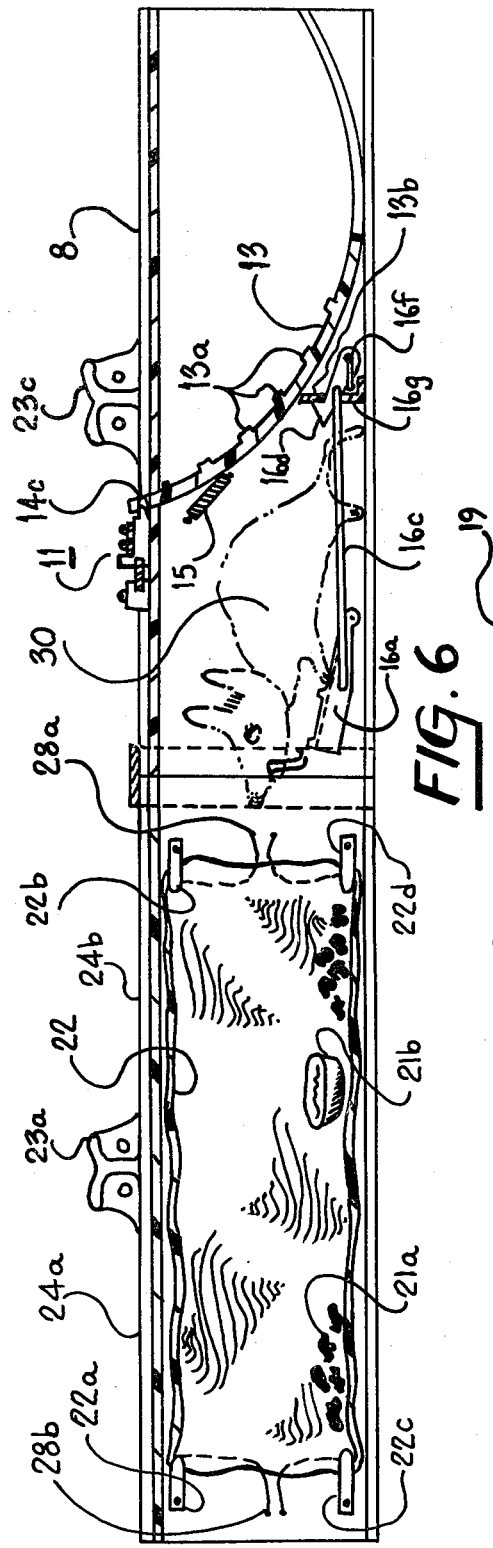
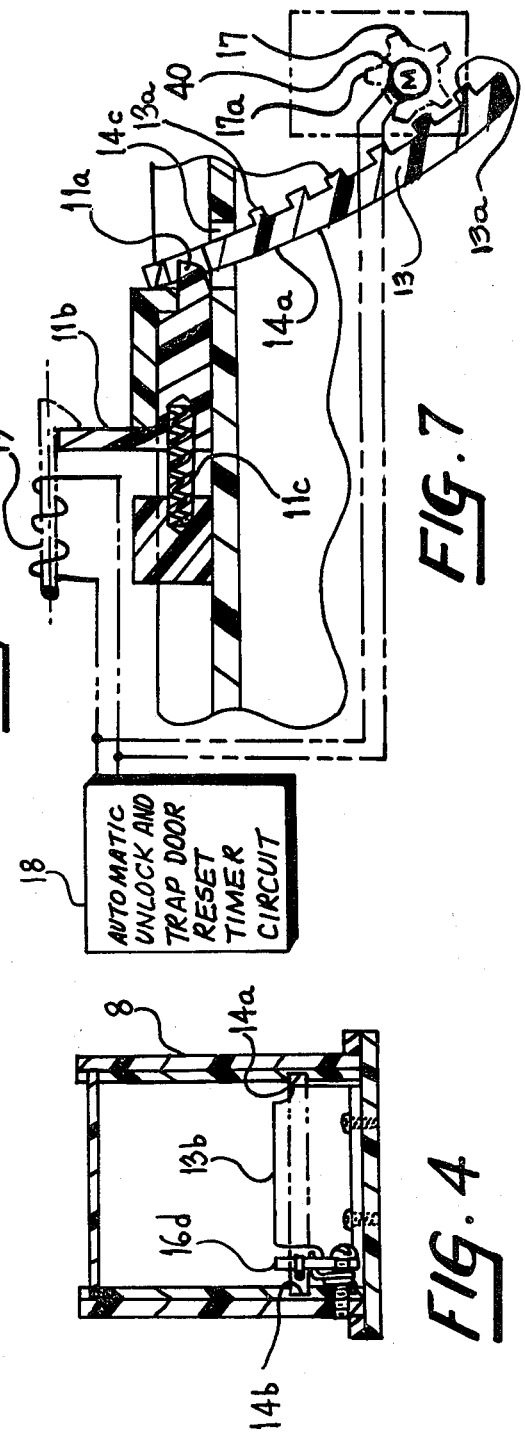

MODULAR ANIMAL TRAP

BACKGROUND OF THE INVENTION

This relates in general to animal traps, and more particularly to modular traps, which include a mechanism triggered by an entering animal to form an air-tight tamper-proof enclosure.

My U.S. Pat. No. 3,965,609, issued June 29, 1976, discloses and claims a trap comprising a plurality of modular units assembled in a tamper-proof array to form a feeding station through which rodents may pass to consume poisonous bait. My U.S. Pat. No. 4,031,653, issued June 28, 1977, discloses a rodent baiting arrangement in which modular plastic units are assembled to form an entrance and feeding station, in which a curved gate member mounted in lateral grooves is disposed to rock forward when an entering animal steps on the gate, and to rock backward, closing the gate, when the animal moves further into the module.

In the case of these and other prior-art traps, it may be possible for the animal to escape from the module by clawing open the door or gate. Furthermore, problems may arise in removing the animal from the trap in a manner to minimize contact with the animal or with poisonous bait, or in resetting the trap for repeated operations.

SHORT DESCRIPTION OF THE INVENTION

Accordingly, it is a principal object of this invention to provide an improved trap comprising one or more modular units which are triggered by an entering animal to close, forming an air-tight, tamper-proof enclosure from which the captured animal cannot excape by clawing its way out.

Another object of the invention is to provide means for automatically resetting the trap.

A further object of the invention is to provide means for disabling the trapping mechanism for pre-baiting.

A still further object of the invention is to provide for removal of the captured animal without contact with the animal or the poisonous bait.

These and other objects are achieved in accordance with the present invention in a trap comprising one or more modules assembled to form a runway for rodents and other animals to be captured, which has a spring-biased entering gate mounted to ride on curved lateral tracks to and fro from open to closed position. The gate, which is initially positioned adjacent to the floor of the module in the path of the entering animal, is spring-biased to respond to a separate trigger mechanism activated when the animal moves across the surface of the gate and into the module beyond, thereby actuating a treadle causing the gate to move forward on the curved lateral tracks to a position closing off the module entrance against the animal's escape. The gate is securely latched against a detent at the top to form a smooth internal barrier, so that the captured animal cannot escape, and moves forward into an internal capture module in which bait is stored, which may be poisoned. In addition to being tightly closed so that the captured animal may not escape by clawing its way out, the capture module is also water-proof and air-tight, and sealed against the possibility of poisonous fumes escaping into the surrounding environment. Thus the modular trap of the present invention is suitable for use outside as well as inside, and is the first product adapted for outside rodent control.

For further convenience, the capture module may be lined with a plastic bag, the closure of which may be controlled by draw-strings at opposite ends. The capture module has a latched, hinged cover at the top, which can be opened to remove the captured animal in the bag, without fear of contamination. As a further alternative, the capture module may be provided with a glue-type base which sticks to the animal's feet and serves as a further means for preventing its escape.

In accordance with one feature, the module containing the trapping mechanism may be provided with means initially to lock the trigger mechanism against operation, so that the trap can be pre-baited prior to capture, allowing the animals to walk in and out freely, to accustom the animals to the presence of the trap.

In accordance with another feature, means may be provided in the form of a timing circuit which will release the trap closure after a specified period to return to its initial unoperated position, so that additional animals can be caught.

It will be understood that the modular trap assemblage in accordance with the present invention has other advantages in addition to those mentioned. For example, it is so constructed that it can either be integrated into a building during construction, or added, either indoors, or out-of-doors, to an already existing building complex. It may be disposed in either a horizontal or vertical position, around the baseboards inside or outside of the walls, between the walls, and even high above the rafters in any place to which a rat, or other animal to be captured may climb.

Furthermore, the modules can be of any size, such as for a small bird or a large dog; and need not be designed to kill the captured animal, but if desired, only to capture and detain the animal until it can be moved to another place.

These and other objects and features of the invention will be better understood from the detailed specification hereinafter with reference to the attached drawings.

SHORT DESCRIPTION OF THE DRAWINGS

FIG. 2 is a longitudinal sectional showing along the plane indicated by the arrows 2—2 of FIG. 1 of one of the gate modules of the trap complex of FIG. 1, with an elliptically configured gate in unoperated position, as the animal enters through one end.

FIGS. 3, 4 and 5 are cross-sectional showings taken along parallel planes, respectively indicated by the arrows 3, 4 and 5 of the gate module of FIG. 2.

FIG. 6 is a longitudinal section, similar to that shown in FIG. 2, with the elliptically configured gate in operated position after the animal has entered and tripped the treadle mechanism, showing a connected inner module for enclosing the trapped animal.

FIG. 7 is a detailed enlarged, fragmentary showing of the detect latching mechanism of FIGS. 3 and 6.

Figure 8:
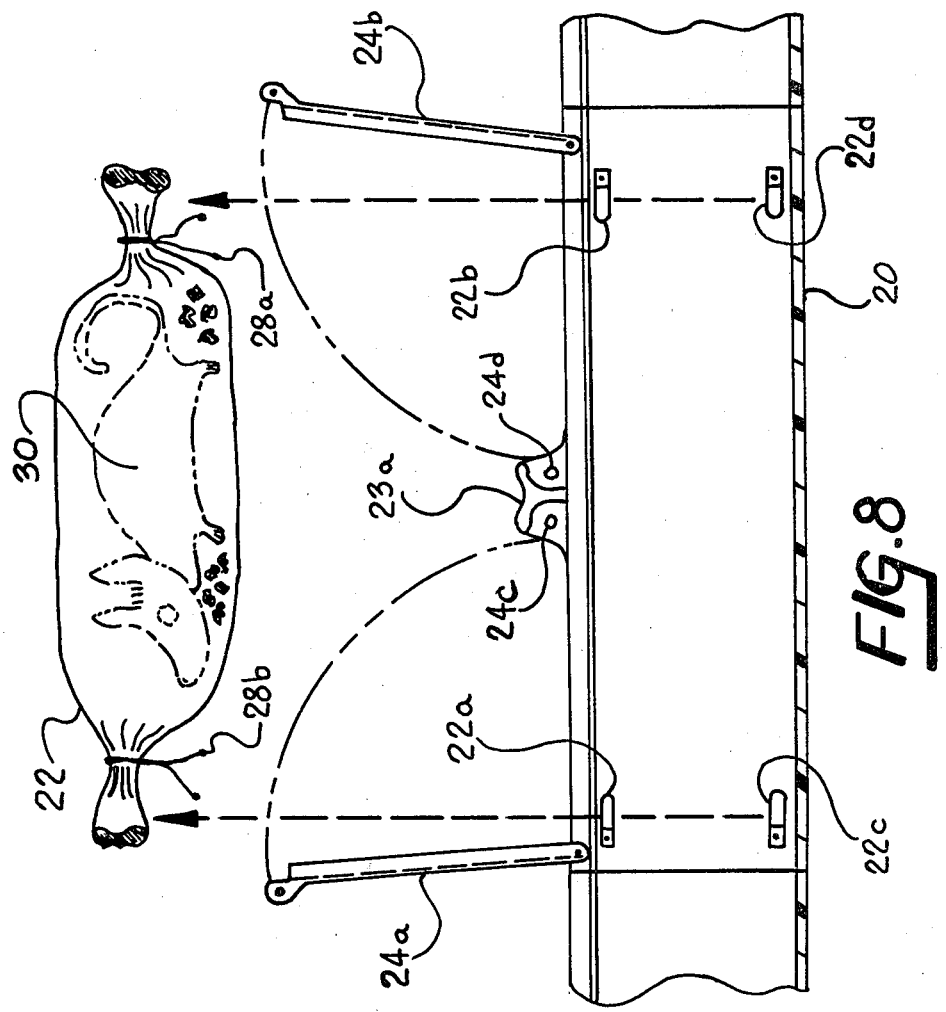

FIG. 8 is a fragmentary showing of the inner capture module opened to remove an enclosing plastic bag, holding the trapped animal.

DETAILED DESCRIPTION

Figure 1:
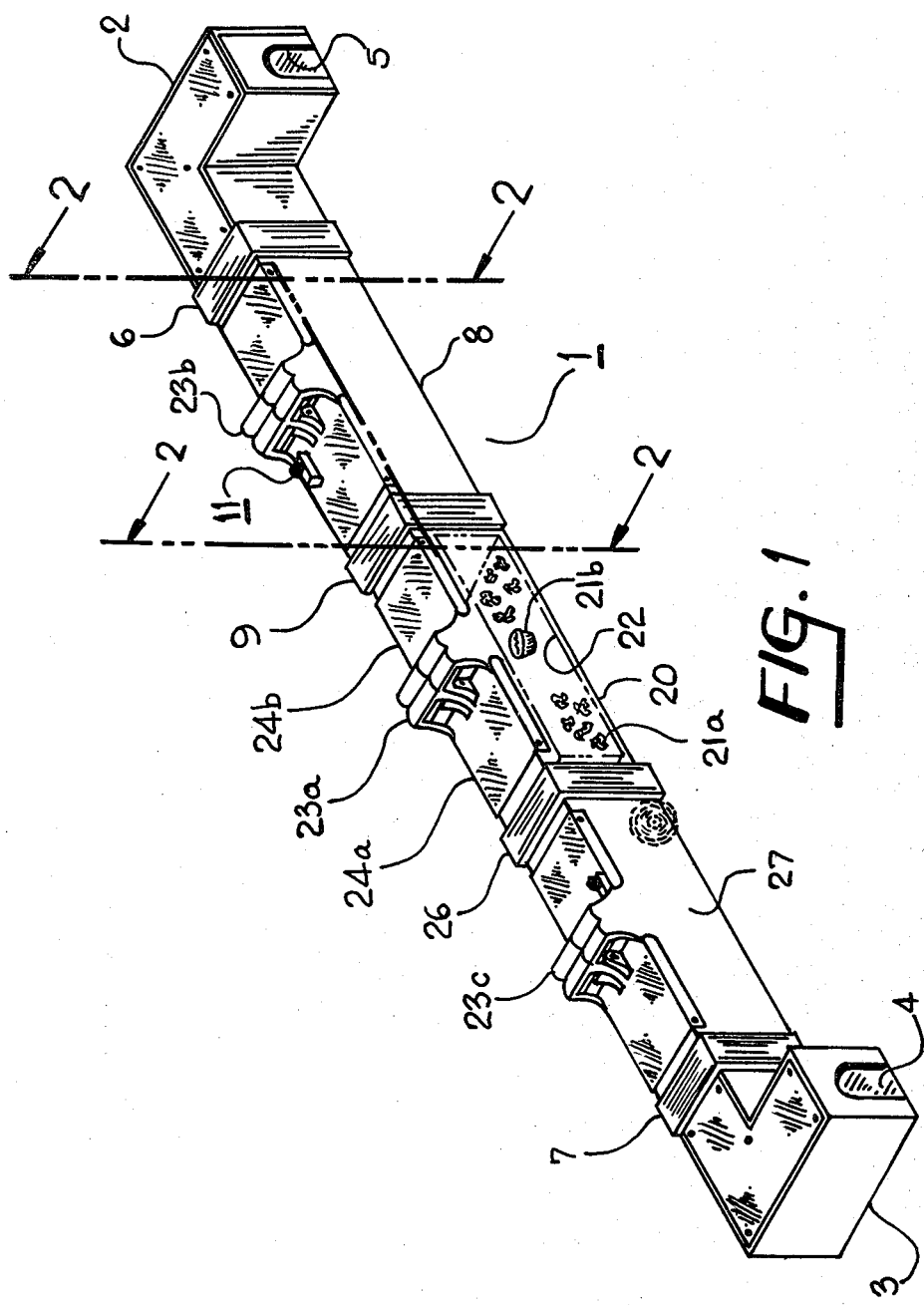
FIG. 1 is an overall showing in external perspective of a modular complex for the trap in accordance with the present invention.

Referring to FIG. 1 of the drawings, there is shown a typical assemblage of modules which are fitted together to form a trap in accordance with the present invention.

In the present illustrative example, the modules are preferably formed of smooth sheets, say ⅛th inch thick, of rigid plastic material, such as, for example, a polymethyl methacrylate, sold by E. I. Du Pont de Neymours under the registered trademark "LUCITE". Preferably, but not necessarily, the sidewalls may be opaque, and the top may be transparent or translucent to enable those monitoring the system to determine whether any animals have been trapped. It will be understood, however, that any suitable rigid plastic material may be used for the purpose of the present invention, and also, other solid material, such as metal or ceramic.

The modules are of hollow rectangular section, about 4⅝ inches wide and 6½ inches in overall height, not including handles. It is contemplated that the assemblage can be built in any desired configuration, preferably at the baseboards, between the foundation and the walls, in the interior or exterior of a building, or in passages between walls or floors, or in any place which would be relatively inconspicuous and where cautious animals, such as rats and mice, are likely to travel.

Although it will be understood that the overall shape, size and number of units in the assemblage will be dictated by the building or purpose for which it is used, the presently-described typical assemblage includes ingress modules at each of its ends, a pair of modules containing trapping means adjacent each of the ingress modules, and a central capture module interposed between the two trapping modules. These rectangular units may be formed integrally, or riveted, bolted or welded together. The separate modules are constructed to be fitted together with dove-tail joints and interconnecting straps, preferably forming air-tight containers when closed.

In the assemblage under description the corner modules 2 and 3 provide entrances at its opposite ends, which extend, roughly, one foot on a side. The function of the corner modules 2 and 3 is to make the trapping mechanism, and inside capture units, which may contain poison, inaccessible to tampering. Each of the corner modules 2 and 3 is closed at its outer ends, except for entry ports 5, and 4, which in the present embodiment are each 3½ inches high and 2½ inches across. The inner ends of corner modules 2 and 3 are secured in dove-tailed relation to the outer ends of respective trap modules 8 and 27, by means of a pair of straps 7 and 6 which are in the form of rectangular sleeves which are welded, bolted or screwed in place to form air-tight interconnections.

Disposed between the inner ends of trap modules 8 and 27 is a capture module 20 which serves to hold the captured animal, in which bait 21a, which may or may not be poisoned, is placed. Instead of, or in addition to bait, the floor of module 20 may be covered with a glue-like substance, such as a product manufactured and sold by J. T. Eaton, Inc., of 1393 Highland Road, Twinsbury, Ohio 44087, under the trademark "STICKUM", or another product manufactured by South Mill Creek, Inc., of P.O. Box 1096, Tampa, Florida 33602, under the trademark "TRAP STICK", which tends to hold the animal fast. Another material such as rodenticide powder burns the animals' feet, whereupon he licks his feet, and reaches for water in a container 21b which may be poisoned. In fact, because of the air-tight, water-tight and tamper-proof construction of the modules of the present invention, highly toxic materials, such as D.D.T. may be used for this purpose, inasmuch as they never come into human contact.

The capture module 20 is held at its opposite ends in dove-tailed communicating relationship to the trapping modules 8 and 27 by means of a pair of straps 9 and 26, which may be in the form of rectangular sleeves, similar to the straps 6 and 7, and removably screwed or bolted in place. It is within the contemplation of the invention that the capture module 20 is readily disengaged from the remaining modules of the assemblage 1 by unbolting or unscrewing and removing the straps 9 and 26, whereby the capture module 20 may then be freely carried about by means of the handle 23a. Because rats are able to gnaw through any material except steel guage, it is contemplated that the capture module 20 will be formed of steel plate and securely welded together. For convenience, the other modules 8 and 27 may also be formed with respective handles 23b and 23c.

Another feature of capture module 20 to facilitate removal of the captured animal is that, in preferred form, it may include a lining bag 22 which is held with both ends open, in juxtaposition to the inner surface, by a plurality of clips 22a, 22b, 22c, and 22d which may be located at its upper corners, and which may be in any desired numbers or positions to properly hold a bag. (See FIG. 6). The bag 22 is preferably formed of a tough, strong plastic material, such as, for example, a heavy gauge polyvinyl chloride, which is flexible, but not easily ruptured. A pair of drawstrings 28a and 28b is threaded around the opposite ends of bag 22 in a manner to enable them to be pulled taut to close the ends.

Thus, as shown in FIG. 8, a captured animal is readily removed from module 20 by pulling taut the drawstrings 28a and 28b to close bag 22, and opening up the top panels 24a and 24b, which are hinged at their outer ends, and are constructed to latch securely at their inner ends adjacent the base of the handle 23a. A pair of latching tongues having internal drill points 24c and 24d project form opposite sides of the handle 23a. These tongues are adapted to mate with forked terminals on panels 24a and 24b when the latter are in closed position. The matching holes in the forked terminals and the drill points in the tongues are adapted to receive a pair of threaded inserts which are easily removed to open the panels. The aforesaid arrangements of the present invention permit easy removal of a captured animal, dead or alive, from the modular assembly, without the handler having manual contact with the animal or any poison to which it may have been exposed.

The most important part of the trap complex is the trapping mechanism in modules 8 and 27, which will now be described. It will be understood that, in a preferred embodiment, each of the modules 8 and 27 may be equipped with trapping mechanism, the two mechanisms being directed in opposite directions for cosing off either or both ends of the trap assemblage at the appropriate time, when an animal enters from one direction, or attempts to leave from the opposite direction. For simplifying the description, only the trap mechanism located in module 8 will be described, although it will be understood that the trap mechanism located in module 27 may be a mirror image, operating in a substantially similar manner.

Referring to FIG. 2, the trap is shown in longitudinal section, set in open position with a rat, shown in phantom, which has entered from the corner module 2. FIGS. 3, 4 and 5 are sectional showings along the length of open trapping module 8, taken on the vertical planes indicated in the drawing.

The gate 13 may be formed of a single sheet, say, ⅛ inch thick, of a semi-rigid flexible plastic material of any of the types previously described, such as, for example, polymethyl methacrylate, known by the registered trademark "LUCITE", say, 8 inches long, and 4 inches wide, and having a radius of curvature of, say, 56°. The external surface of gate member 13 may be embossed with a series of say, seven laterally-extending linear projections 13a, about ¼ inch wide and ⅜ inch above the surface, which are symmetrically disposed in parallel relation, being spaced-apart at intervals of, say, 1¼ inches along the length of the gate. The inner surface of gate 13 and its edges are smooth. The opposite edges of gate 13 slideably engage a pair of grooved tracks 14a and 14b, 3/16 inch wide and 3/16 inch deep which are molded or engraved into the interior of the sidewalls of module 8. In a length direction along the sidewalls, the tracks 14a, 14b are in the form of parallel curves, each having a radius of curvature of, say, 57½°, the outer ends of which are, say, 1⅜ inches above the floor of module 8, and which are substantially tangential to the inner floor of the module along a line, say, 4⅜ inches in from the outer end, and which extend up to and conform to a notch in the ceiling of module 8 along a line parallel to and a little over a foot inside the outer end of the module.

A biasing spring 15, which may comprise a conventional coil spring, is connected with one end secured to a post 15a at a position on the top or sidewall of the module 8, well inside of the inner ends of the tracks 14a, 14b. The other end of coil spring 15 is connected to a post 15b on the inner side of gate 13, say, 1½ inches from its inner end.

The gate 13 is held in open position by means of a tripping mechanism 16. This includes a treadle 16a, say, 4½ inches long, and about as wide as the gate 13, which is pivotally disposed to rock to-and-fro about a pivot arm 16b which is located on the floor of module 8, say, about 3½ inches inside of the inner ends of tracks 14a, 14b. The treadle 16a preferably has a plurality of linear projections 16e on its upper surface which are similar to projections 13a on gate 13. A lever arm 16c, say, 10 inches long, is connected to treadle 16a at a point about 2 inches from the pivot, and extends to a latch member 16d, also pivoted about its lower end 16f, the notched head of which operates against the bias of leaf-spring 16g to engage the inner end of gate 13 when the latter is in open position, holding 13 against the bias of spring 15. The shield 13b protects latch member 16d from contact by the captured animal.

When the rat or other animal enters the module 8, walking the length of the gate 13, and beyond, stepping on, and rotating the treadle 16a in a counterclockwise direction, the arm 16c is actuated, pulling the latch 16d out of engagement with the projection on the end of gate 13. The latter is thereby caused to snap closed by moving along the track 14a, 14b under the urging of coil spring, ultimately coming to rest in closed position with its upper edge engaged in a slot 14c in the inner surface of the roof of module 8. The edge of gate 13 is secured in latched closed position by means of the spring-biased tongue 11a of detent means 11. (See FIG. 7).

The trap can be manually set for reoperation by pushing the projecting member 11b to the left against the compression of the spring 11c, and manually grasping and pulling the gate 13 to open position, with its inner end being secured against the treadle latch 16d.

In accordance with an alternative arrangement, an electrical timer circuit 18 is of a type well-known in the art, such as shown, for example in the 1982 Catalogue #341 of RADIO SHACK, page 79, Compact Plug-In Timer, 63-862, or Multiple Program Timer number 63-864. Such a timing device, when plugged into a conventional source of AC power, or modified for battery operation, and wired in a conventional manner, may be set, after a preselected time delay, to energize a solenoid 19 to pull back the detent tongue 11a, releasing the upper end of gate 13. Simulaneously, the timer circuit 18, through a parallel circuit, operates to energize a small motor 40 which drives a gear 17 having a series of sprockets 17a designed to engage the projections 13a on the surface of the gate 13, moving in a counterclockwise direction, to pull down the gate 13 into open position, wherein it is latched against the treadle-actuated latch 16d. The projections 13a on gate 13 would be closely spaced for this purpose, in order to conform to the distance between sprockets 17a.

Another feature of the invention is the disabling device 12. The latter comprises a lever 12a bent at right angles, which is manipulated by means of a handle 12b from the outside of the module to engage the underside of the treadle 16a to prevent the treadle from rotating to trigger the trap to close, even though animals run back and forth over the treadle. This permits the trap operator to engage in a course of pre-baiting the trap, to accustom the animals to run back and forth through the module assemblage, so that the natural cautiousness of rats or other rodents is overcome before the trap is actually set.

Although the invention has been described by way of example, with reference to specific structures, it will be understood that practice of the invention is not limited to the structures described but may include any modifications within the scope of the appended claims.

What I claim is:

1. A trapping device for capturing animals which comprises in combination:

one or more modular units comprising a first substantially rigid hollow structure having a base portion, top and side walls, assembled to provide a continuous runway for said animals which is closed except for one or more ingress areas initially open and large enough to admit one of said animals;

at least one gate;

a pair of curved tracks disposed on opposite inner walls of said first rigid hollow structure;

said gate mounted to ride to-and-fro along said tracks internally in said rigid hollow structure from said initial open position in which the principal plane of said gate is adjacent the floor of said first hollow structure near said ingress area to a closed position in which said gate is interposed transversely across said ingress area, completely closing said ingress area;

spring-biasing means connected between said gate and a point inside said rigid hollow structure in the area in which said animal is to be confined to urge said gate from open to closed position;

and means comprising a treadle in said rigid hollow structure in the path of an entering animal, beyond said ingress area, said treadle constructed and arranged to trigger said spring-biasing means to urge said gate to move along said tracks from said open to said closed position, for preventing said animal from escaping through said ingress area;

wherein said first hollow structure includes in the top wall thereof a slot intermediate the ends of said structure, a first latching means including detent means disposed on the exterior of said top wall adjacent said slot, said detent means being constructed and arranged to be inaccessible to the area in which said animal is confined and to said ingress area, and said detent means responsive to operate upon impact by the leading edge of said spring-biased gate when said leading edge passes through said slot to engage and secure said gate in closed, latched position.

2. A trapping device in accordance with claim 1 which includes control means for controlling the opening and closing of said detent means from an external wall of said rigid hollow structure.

3. A trapping device for capturing animals which comprises in combination:

one or more modular units comprising a first substantially rigid hollow structure assembled to provide a continuous runway for said animals which is closed except for one or more ingress areas initially open and large enough to admit one of said animals;

at least one gate;

a pair of curved tracks disposed on opposite inner walls of said first rigid hollow structure;

said gate mounted to ride to-and-fro along said tracks from said initial open position in which the principal plane of said gate is adjacent the floor of said first hollow structure near said ingress area to a closed position in which said gate is interposed transversely across said ingress area, completely closing said ingress area;

spring-biasing means connected to said gate to urge said gate from open to closed position;

means comprising a treadle located in the path of an entering animal, beyond said ingress area, said treadle constructed and arranged to trigger said spring-biasing means to urge said gate to move along said tracks from said open to said closed position, for preventing said animal from escaping through said ingress area;

wherein said first hollow structure includes a first latching means for including detent means for engaging and securing said gate in closed, latched position;

said trapping device including control means for controlling the opening and closing of said detent means from an external wall of said rigid hollow structure; and wherein said control means includes a timing mechanism connected to initiate release of said first latching means including said detent means at a preselected interval after said gate is closed, and to initiate mechanical actuation of said gate to move against the tension of said spring to said initial open position, thereby setting said trap for reoperation.

4. The combination in accordance with claim 3 wherein said control means includes an electrical circuit comprising a solenoid for releasing said detent means, and a motor-driven gear to mechanically actuate said gate to move against the tension of said spring to said initial open position.

5. A trapping device for capturing animals which comprises in combination:

one or more modular units comprising a first substantially rigid hollow structure assembled to provide a continuous runway for said animals which is closed except for one or more ingress areas initially open and large enough to admit one of said animals;

at least one gate;

a pair of curved tracks disposed on opposite inner walls of said first rigid hollow structure;

said gate mounted to ride to-and-fro along said tracks internally in said rigid hollow structure from said initial open position in which the principal plane of said gate is adjacent the floor of said first hollow structure near said ingress area to a closed position in which said gate is interposed transversely across said ingress area, completely closing said ingress area;

spring-biasing means connected internally between said gate and a point inside said rigid hollow structure to urge said gate from open to closed position;

and means comprising a treadle located in said rigid hollow structure in the path of an entering animal, beyond said ingress area, said treadle constructed and arranged to trigger said spring-biasing means to urge said gate to move along said tracks from said open to said closed position, for preventing said animal from escaping through said ingress area;

said trapping device including a second latching means constructed and arranged to be set manually to lock said treadle against actuation by said entering animal, whereby said gate is maintained in open position in said rigid hollow structure to permit animals to enter and leave freely during a pre-baiting phase.

6. A trapping device in accordance with claim 1 in which said one or more modular units include a capture module connected to and communicating with an egress from said first hollow structure at a position inside of said ingress area;

said capture module including means for holding bait for enticing an animal to enter into said capture module after said gate has closed off said ingress area.

7. A trapping device in accordance with claim 6 wherein said capture module is formed of rodent-proof material and includes means for alternatively securing and disengaging said capture module from the remaining said modular units, and wherein said capture module includes a retrieval opening large enough for removal of said animal, and a latched cover for said opening.

8. A trapping device in accordance with claim 7 wherein a bag of flexible material, open in at least one ned, is disposed to line the internal walls of said capture module, and is constructed to receive said animal as it enters said capture module from said first rigid hollow structure;

and means comprising at least one drawstring for closing said bag with the animal in it, and removing said bag from said capture module through said retrieval opening.

9. The combination in accordance with claim 1 wherein said one or more modular units comprise a plurality of interconnected hollow parallelepipeds formed of rigid plastic material, said first hollow structure having an ingress opening in at least one end;

said at least one gate comprising a flexible plastic structure having its edges slideably engaging curved tracks disposed on the opposite internal lateral walls of said first hollow structure, said gate being smooth on its inner face and including a series of transversely disposed parallel projections on its outer surface;

said spring-biasing means comprising a coil spring having one end connected to the inside of the gate, and the other end anchored to the interior of said first hollow structure;

said treadle disposed to rotate about a pivot, and connected by a rod to a stop mechanism disposed to engage and hold said gate in open position against the tension of said spring, and upon actuation of said treadle to disengage said stop mechanism from said gate, whereby said gate moves up said track to closed position under the urging of said spring.

10. A subcombination in accordance with claim 9 wherein said first hollow structure is molded as a single integral unit to include on its opposite inner lateral walls two pairs of curved tracks, extending symmetrically in oppositely curved relation in the planes of said walls from the floor to the ceiling of said hollow structure, whereby said hollow structure is constructed to have a gate mounted to close off the entrance at either the right-hand or left-hand end of said hollow structure.

* * * * *

UNITED STATES PATENT AND TRADEMARK OFFICE
CERTIFICATE OF CORRECTION

PATENT NO. : 4,418,493
DATED : December 6, 1983
INVENTOR(S) : Carmel T. Jordan

It is certified that error appears in the above-identified patent and that said Letters Patent are hereby corrected as shown below:

Column 5, line 66, after "spring" insert ---15---.
Column 8, line 58, beginning of line, change "ned" to ---end---.
Column 9, line 4, after "edges" change "slideably" to ---slidably---.

Signed and Sealed this

Fourteenth Day of February 1984

[SEAL]

Attest:

GERALD J. MOSSINGHOFF

Attesting Officer   Commissioner of Patents and Trademarks